(12) United States Patent
Miazgowicz

(10) Patent No.: US 9,500,198 B2
(45) Date of Patent: Nov. 22, 2016

(54) MULTIPLE SPOOL TURBOCHARGER

(71) Applicant: Ford Global Technologies, LLC, Dearborn, MI (US)

(72) Inventor: Keith D. Miazgowicz, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 953 days.

(21) Appl. No.: 13/769,086

(22) Filed: Feb. 15, 2013

(65) Prior Publication Data

US 2014/0234072 A1    Aug. 21, 2014

(51) Int. Cl.

| | |
|---|---|
| *F04D 19/02* | (2006.01) |
| *F04D 19/00* | (2006.01) |
| *F01D 1/24* | (2006.01) |
| *F01D 1/18* | (2006.01) |
| *F04D 17/02* | (2006.01) |
| *F04D 25/02* | (2006.01) |
| *F01D 5/06* | (2006.01) |
| *F02C 3/107* | (2006.01) |
| *F02C 6/12* | (2006.01) |

(52) U.S. Cl.
CPC ............... *F04D 19/00* (2013.01); *F01D 1/18* (2013.01); *F01D 1/24* (2013.01); *F01D 5/06* (2013.01); *F02C 3/107* (2013.01); *F02C 6/12* (2013.01); *F04D 17/025* (2013.01); *F04D 19/024* (2013.01); *F04D 25/024* (2013.01); *F05D 2220/40* (2013.01)

(58) Field of Classification Search
CPC ............ F01D 5/04; F01D 5/043; F01D 5/06; F01D 1/18; F01D 1/24; F05D 2220/40; F05D 2270/10; F05D 2270/101; F02C 6/12; F02C 3/107; F04D 17/025; F04D 19/02; F04D 19/024; F04D 25/024; F04D 25/04; F04D 27/005; F04D 27/009; F04D 27/0207; F04D 27/0269

See application file for complete search history.

(56) References Cited

U.S. PATENT DOCUMENTS

| | | | |
|---|---|---|---|
| 4,674,284 A | 6/1987 | Kronogård et al. | |
| 6,422,014 B1 * | 7/2002 | Gladden | F01D 17/105 123/564 |
| 6,735,951 B2 | 5/2004 | Thompson | |
| 6,931,856 B2 | 8/2005 | Belokon et al. | |
| 7,150,152 B2 * | 12/2006 | Kilkenny | F02B 37/013 384/100 |
| 7,490,594 B2 | 2/2009 | Van Dyne et al. | |
| 7,571,607 B2 | 8/2009 | Vrbas | |
| 8,220,245 B1 | 7/2012 | Papandreas | |
| 2005/0126182 A1 | 6/2005 | Teets et al. | |
| 2007/0130944 A1 * | 6/2007 | Pelletier | F01D 5/048 60/605.1 |
| 2009/0038309 A1 * | 2/2009 | Cocca | F02B 37/013 60/603 |
| 2009/0249786 A1 | 10/2009 | Garrett et al. | |
| 2012/0152214 A1 | 6/2012 | Thorne et al. | |
| 2012/0269636 A1 * | 10/2012 | Xu | F01D 5/141 416/185 |
| 2013/0136587 A1 * | 5/2013 | Wang | F04D 25/0606 415/191 |

FOREIGN PATENT DOCUMENTS

DE            3932721 C1 * 10/1990 ............. F01D 5/022

* cited by examiner

*Primary Examiner* — Richard Edgar
*Assistant Examiner* — Jesse Prager
(74) *Attorney, Agent, or Firm* — Julia Voutyras; Alleman Hall McCoy Russell & Tuttle LLP

(57) ABSTRACT

Systems and methods for a multiple spool engine turbocharger are described. In one example approach, a multi-spool turbocharger comprises a compressor including a plurality of counter-rotating compressor spools and a turbine including a plurality of counter-rotating turbine spools.

9 Claims, 6 Drawing Sheets

MULTIPLE SPOOL TURBOCHARGER

BACKGROUND/SUMMARY

Downsizing of internal combustion engines and increasing power requirements lead to higher engine specific output for boosted applications. As the requirements increase, the turbochargers must also increase flow capacity and boost levels to obtain higher performance levels (Hp). The increase in turbocharger size comes as a detriment to the low end performance metrics including surge, low end torque peak, and transient operation regimes including time-to-torque, and tip in acceleration.

The inventors herein have recognized the above-mentioned limitations and have developed a multi-spool turbocharger for an engine. In one example approach, a multi-spool turbocharger comprises a compressor including a plurality of single-rotating compressor spools and a turbine including a plurality of single-rotating turbine spools. In a second example approach, a multi-spool turbocharger comprises a compressor including a plurality of counter-rotating compressor spools and a turbine including a plurality of counter-rotating turbine spools.

Such a multi-spool turbocharger has the potential advantage of operating as a smaller turbine over a larger operating range, and in effect is "downsized" from a performance standpoint. Further, such multi-spool turbochargers can increase the flow capacity of a turbocharger without adversely affecting the low end performance metrics of the internal combustion engine. For example, such a multi-spool turbocharger may be used instead of a twin turbo system and may outperform the twin turbo system especially at the low end operating range of the engine.

Further, components of a multi-spool turbocharger can be scaled down relative to conventional turbocharger systems, leading to a potential reduction in the diameter or size of the turbocharger making it easier to package, a reduction in the mass of spools in the turbocharger leading to an increase in the surge margin, and a reduction of the inertia of each spool to allow it to accelerate easier to improving transient vehicle operation like acceleration and time-to-torque.

Further, each spool of a multi-spool turbocharger system can be designed to accomplish different tasks at different operating regimes in the engine system. For example, a two spool can be designed to have each spool operate in a similar regime to balance aerodynamic and mechanical loads in the system. The rotational speed of a spool may be controlled to spooled down or the airflow though a spool can be bypassed in the system to reduce engine pumping work, and increase the low end operating range of the engine further. Spools can be designed to target different tasks and replace complicated systems like supercharger/turbocharger combinations, e-boost systems, series sequential, and dual boost systems at substantial cost savings, reduced size, and packaging improvements.

Additionally, the concentric shafts of the multi-spool turbocharger may be made to rotate in opposite directions (counter-rotation). Such counter-rotation may result in the elimination of variable interstage stators or other flow modification components thus reducing flow losses in the turbocharger and increasing the energy output of the turbine.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
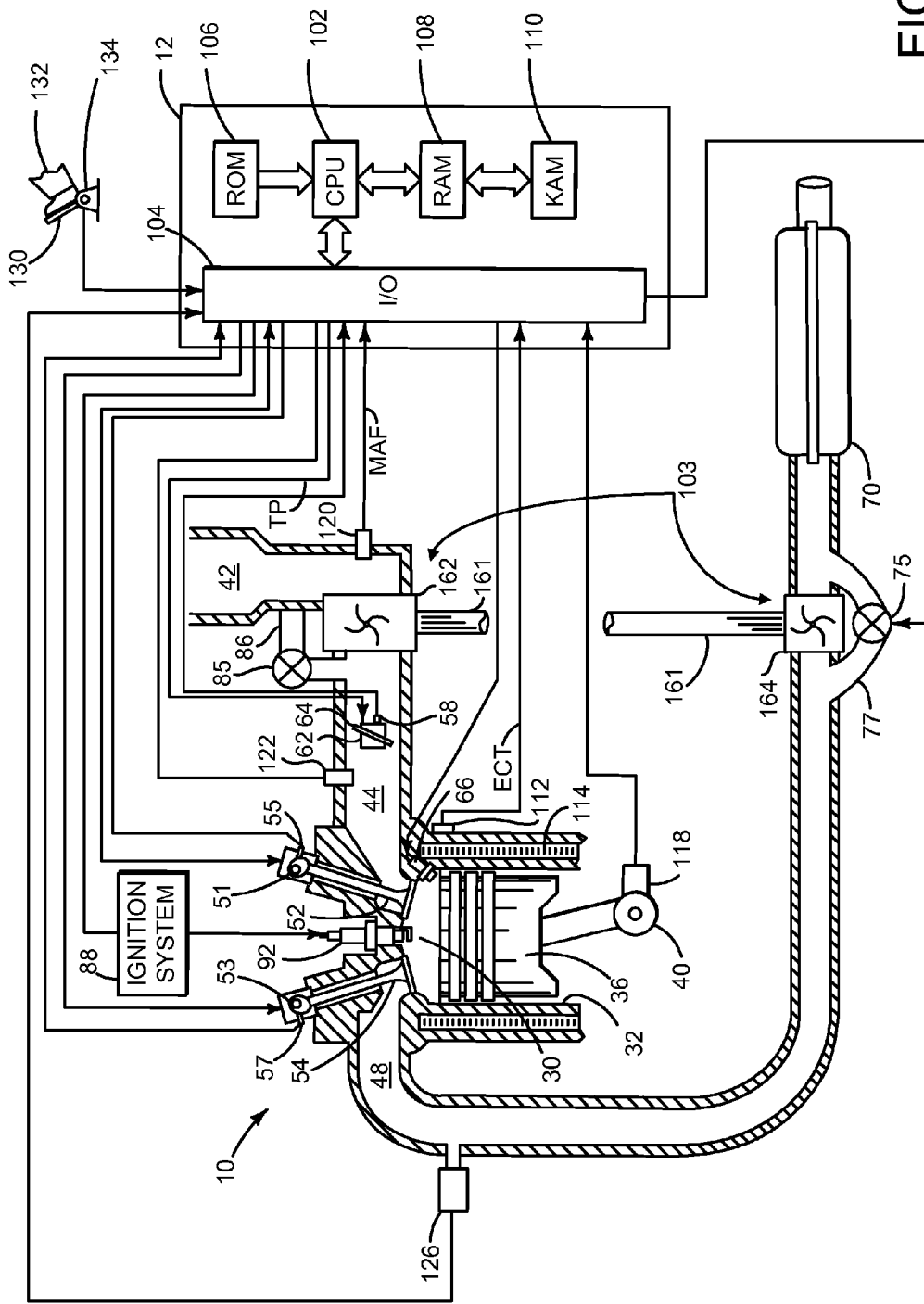
FIG. 1 shows a schematic depiction of a turbocharged engine.
Figure 2:
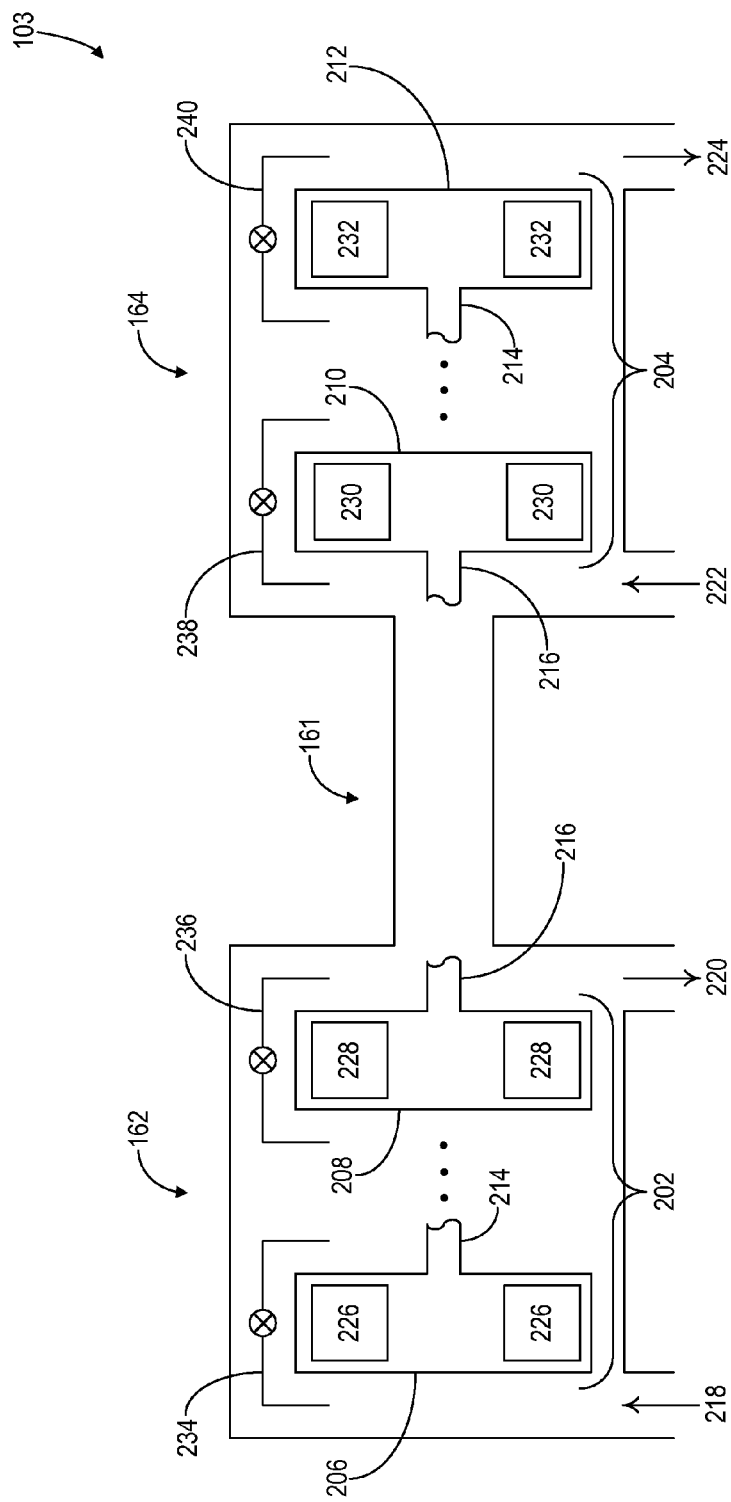
FIG. 2 shows a schematic depiction of a multiple spool turbocharger in accordance with the disclosure.
Figure 3A:
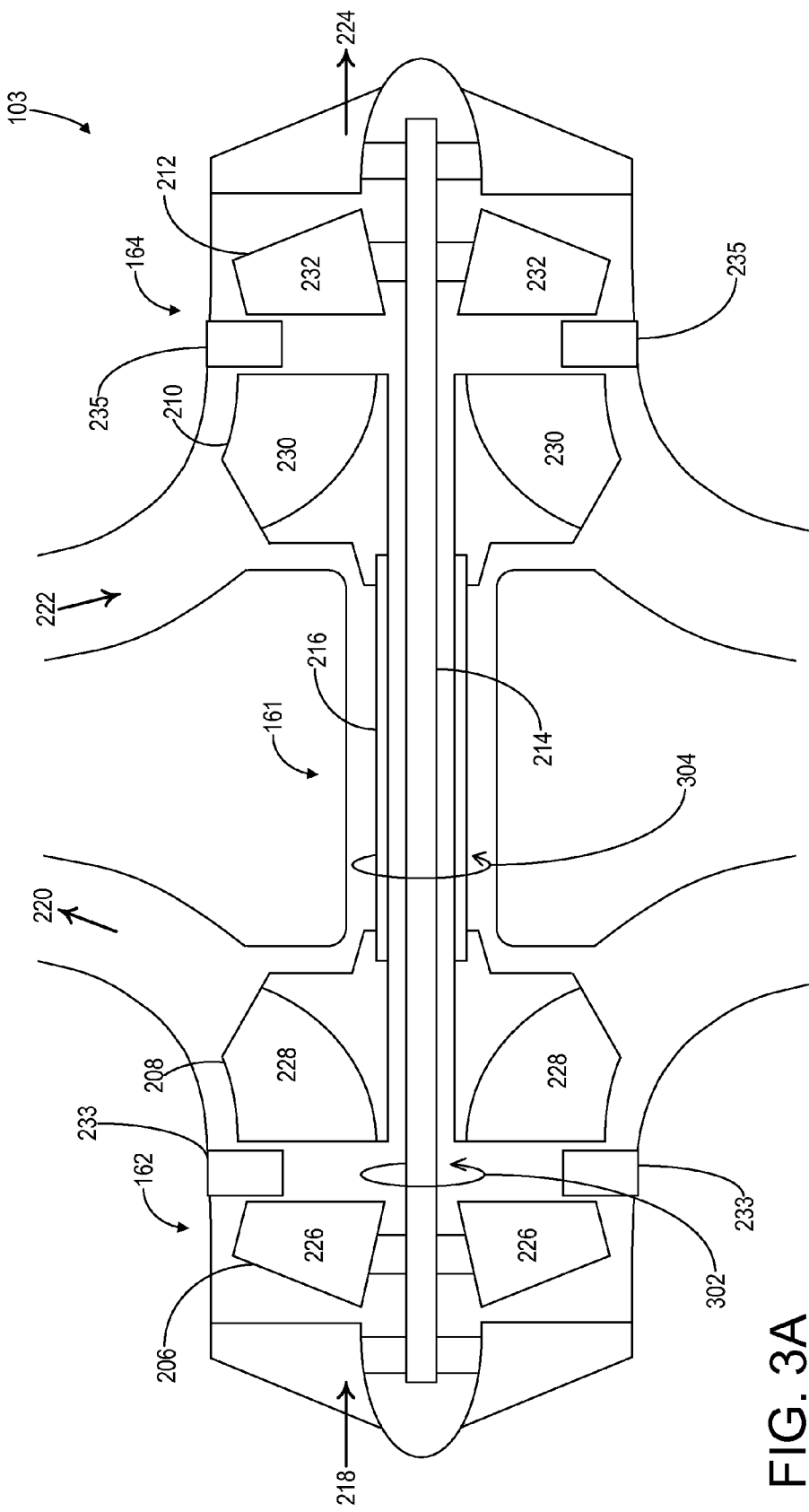
FIG. 3A shows an example multiple spool turbocharger in accordance with the disclosure.
Figure 3B:
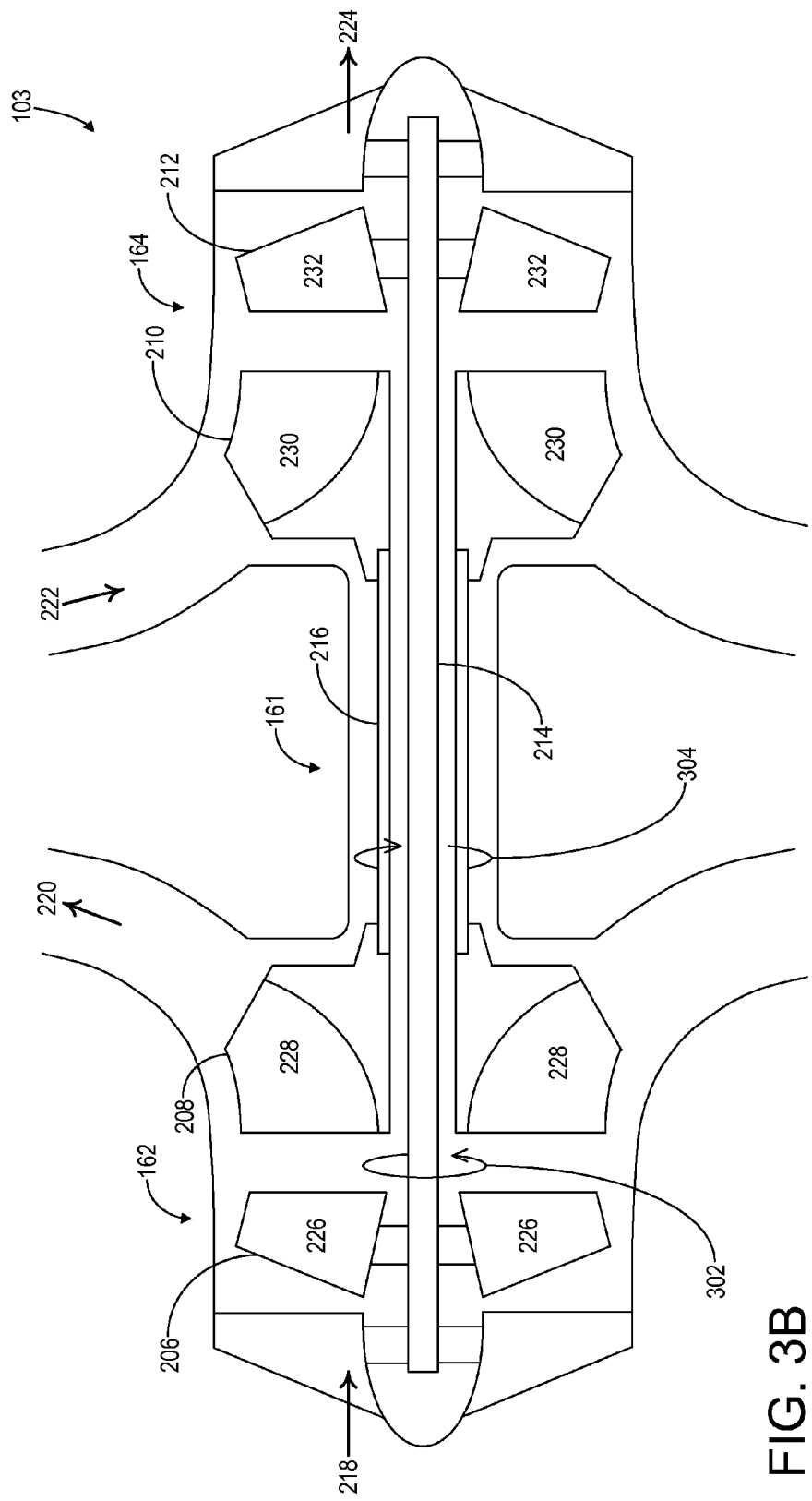
FIG. 3B shows an example multiple spool counter-rotating turbocharger in accordance with the disclosure.

The present description relates to a multiple spool turbocharger in an internal combustion engine, such as the engine shown in FIG. 1. As shown in FIGS. 2, 3A, and 3B, such a multiple spool turbocharger includes a compressor with a plurality of compressor spools or stages and a turbine with a plurality of turbine spools or stages. Each compressor spool may be coupled to a corresponding turbine spool via a shaft and different shafts for different pairs of spools may be configured to rotate in the same or opposite directions in order to increase flow between different stages of the compressor and turbine. As illustrated in the velocity diagrams shown in FIG. 4, such a counter-rotating multi-spool turbocharger may have an increased energy output relative to a single stage turbocharger at the same speeds. Further, as shown in the method of FIG. 5, each spool of a multi-spool turbocharger system can be designed to accomplish different tasks at different operating regimes in the engine system.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to a pulse width provided by controller 12. Fuel is delivered to fuel injector 66 by a fuel system (not shown) including a fuel tank, fuel pump, and fuel rail (not shown).

Engine 10 includes a multiple spool turbocharger 103 which includes a compressor 162 and a turbine 164. Intake manifold 44 is supplied air by compressor 162. Exhaust gases rotate one or more spools within turbine 164 which is coupled to shaft 161, thereby driving one or more spools in compressor 162. As described in more detail below with regard to FIGS. 2 and 3, compressor 162 may include a plurality of different spools which form different stages within the compressor. For example, compressor 162 may include radial spools, axial spools, and/or mixed-flow spools, where a mixed flow spool has a geometry half-way between a radial and axial design.

Likewise, turbine 164 may include a plurality of different spools which form different stages within the turbine. For example, turbine 164 may include radial spools, axial spools, and/or mixed-flow spools. Further, as described in more detail below, shaft 161 may include a plurality of shafts, where each shaft in the plurality of shafts couples a spool in the compressor with an associated spool in the turbine.

In some examples, a bypass passage 77 may be included so that exhaust gases may bypass turbine 164 during selected operating conditions. Flow through bypass passage 77 may be regulated via waste gate 75. Further, a compressor bypass passage 86 may be provided in some examples to limit pressure provided by compressor 162. Flow though bypass passage 86 may be regulated via valve 85. In addition, intake manifold 44 is shown communicating with central throttle 62 which adjusts a position of throttle plate 64 to control air flow from engine air intake 42. Central throttle 62 may be electrically operated.

Distributorless ignition system 88 provides an ignition spark to combustion chamber 30 for igniting an air-fuel mixture via spark plug 92 in response to controller 12. In other examples, the engine may be a compression ignition engine without an ignition system, such as a diesel engine. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

FIG. 2 shows a schematic depiction of cross-section of a multiple spool turbocharger 103. Turbocharger 103 includes a compressor 162 and a turbine 164 coupled via a shaft system 161. As described in more detail below, shaft system 161 may include a plurality of concentric shafts coupling different pairs of spools included in the compressor and turbine. Compressor 162 includes an air inlet 218, e.g., a fresh air inlet, and a compressed air outlet 220. Turbine 164 includes an exhaust inlet 222 and a discharge outlet 224. For example, inlet 218 may receive fresh air from intake 42 shown in FIG. 1 and may output compressed air via outlet 220 into the intake manifold 44 of engine 10. Turbine inlet 222 may receive exhaust gases from exhaust manifold 48 which may be used to drive turbine spools in the turbine. The exhaust gas may be discharged via turbine outlet 224 into an exhaust aftertreatment system, e.g., emission control device 70, before exiting to the atmosphere.

Compressor 162 includes a plurality of compressor spools 202, e.g., one or more compressor spools, and turbine 164 includes a plurality of turbine spools 204, e.g., one or more turbine spools. In some examples, the plurality of compressor spools 202 may includes at least a first compressor spool 206 and a second compressor spool 208 and the plurality of turbine spools 204 may include at least a first turbine spool 210 and a second turbine spool 212. The compressor and turbine may each include any number of spools, e.g., the compressor may include two, three, or four different spools and the turbine may include two, three, or four different spools. The spools included in the compressor and turbine may be of any suitable configuration. For example, the plurality of compressor spools 202 in compressor 162 may include only radial or centrifugal spools, only axial spools, only mixed-flow spools, or combinations of radial, axial, and/or mixed-flow spools. Likewise, the plurality of turbine spools 204 in turbine 164 may include only radial or centrifugal spools, only axial spools, only mixed-flow spools, or combinations of radial, axial, and/or mixed-flow spools.

For example, the first compressor inlet stage 206 may be radial, the second compressor outlet stage 208 may be axial, the first turbine inlet stage 210 may be axial, and the second turbine outlet stage 212 may be radial. As another example, the first compressor inlet stage 206 may be axial, the second compressor outlet stage 208 may be radial, the first turbine inlet stage 210 may be radial, and the second turbine outlet stage 212 may be axial. As still another example, at least one of the first compressor inlet stage 206 and second compressor outlet stage 212 may be mixed-flow. It should be understood that other combinations of axial, radial, and mixed flow spools may be included in turbocharger 103. Each spool of the multi-spool turbocharger 103 can be designed to accomplish different tasks at different operating regimes in the engine system, as further described with regard to FIG. 5.

Each spool in turbocharger 103 includes a plurality of blades configured to cause the spool to rotate when air is directed at an incident angle to the blades. The direction of rotation of a spool may be dictated by the angle of the blades. For example, first compressor 206 includes blades 226, second compressor spool 208 includes blades 228, first turbine spool 210 includes blades 230, and second turbine spool 212 includes blades 232.

Each spool in turbocharger 103 is mechanically coupled to a shaft. For example, first compressor spool 206 is coupled to shaft 214 and second compressor spool 208 is coupled to shaft 216. Each compressor spool may have an associated turbine spool and may be coupled to a common shaft as its associated turbine spool. For example, second turbine spool 212 may be associated with first compressor spool 206 and may also be coupled to shaft 214. Likewise, first turbine spool 210 may be associated with second compressor spool 208 and may also be coupled to shaft 216. Shafts coupling different pairs of associated compressor and turbine spools may be configured to rotate in different directions. For example, shaft 214 coupling spools 206 and 212 may be rotatable in a first direction whereas shaft 216 coupling spools 208 and 210 may be rotatable in a second direction opposite the first direction. For example, shaft 214 may be rotatable in a counter-clockwise direction whereas shaft 216 may be rotatable in a clock-wise direction. Thus, shaft system 161 may include a plurality of different shafts coupling different pairs of turbine and compressor spools and each shaft in shaft system 161 may be configured to rotate independently of other shafts in shaft system 161 so that alternating pairs of associated turbine and compressor spools may rotate in different directions about their respective shafts.

For example, first compressor spool 206 and second turbine spool 212 may be configured to rotate in a first direction around shaft 214 whereas a compressor spool adjacent to compressor spool 206 and a turbine spool adjacent to turbine spool 212 may be configured to rotate in a second direction opposite the first direction. For example, in the direction of air flow through compressor 162, compressor 162 may include a first spool followed by a second spool followed by a third spool, etc. In this example, the first spool may rotate in a first direction, the second spool may rotate in a second direction opposite from the first direction, and the third spool may also rotate in the first direction so that the direction of rotation alternates between subsequent stages of the compressor and turbine. In this way, air may be directed incident to the blades of each successive spool stage in the compressor and turbine without the use of vanes or stators to redirect air flow between different stages of the turbocharger resulting in a reduction in gas flow losses through the turbocharger and increased output of the turbocharger.

In some examples, during certain conditions gas flow through one or more spools in turbocharger 103 may be bypassed. Thus, in some examples, at least one spool in turbocharger 103 may include a bypass conduit configured to direct gas flow away from the spool. For example, a bypass 234 may be included in turbocharger 103 to direct gas flow away from or around compressor spool 206, a bypass 236 may be configured to direct gas flow away from compressor spool 208, a bypass 238 may be configured to direct gas flow away from turbine spool 210, and a bypass 240 may be configured to direct gas flow away from turbine spool 212. In this way, during certain conditions, different spools may be selectively used to compress air or drive the turbocharger.

For example, during a first condition, it may be desirable to supply compressed air to an engine using only the first spool 206. In this example, bypass 236 may be actuated to direct air flow away from compressor spool 208 so that compressed air from spool 206 does not flow through spool 208 and instead is provided to the engine via outlet 220. As another example, during a second condition, it may be desirable to supply compressed air to an engine using only the second spool 208. In this example, bypass 234 may be actuated to direct air flow away from compressor spool 208 so that intake air received from conduit 218 bypasses spool 206 and is directed to spool 208 for compression.

Likewise, different turbine spools may be bypassed during certain conditions to drive the turbocharger. For example, during a first condition, it may be desirable to drive the turbine using only the first turbine spool 210. In this example, bypass 240 may be actuated to direct gas flow around turbine spool 212 so that exhaust gas from spool 210 does not flow through spool 212 and instead is discharged to the atmosphere via outlet 224. As another example, during a second condition, it may be desirable to drive the turbine using only the second turbine spool 212. In this example, bypass 238 may be actuated to direct gas flow away from turbine spool 210 so that exhaust gas received from conduit 222 bypasses spool 210 and is directed to spool 212.

FIG. 3A show a first example multiple spool turbocharger 103 with a two stage compressor 162 and a two stage turbine 164. Like numbers shown in FIG. 3A correspond to like numbered elements shown in FIG. 2 described above. In this example, compressor 162 includes an axial first stage spool 206 and a mixed flow second stage spool 208 and turbine 164 includes a mixed flow first stage spool 210 and an axial second stage spool 212. For example, spool 206 may be a low-pressure axial compressor wheel whereas spool 208 may be a high-pressure radial compressor wheel. Likewise spool 212 may be a low-pressure axial turbine wheel and spool 210 may be a high-pressure radial turbine wheel. Though, FIG. 3A shows an axial first compressor stage, a mixed flow second compressor stage, a mixed flow first turbine stage, and an axial second turbine stage, it should be understood that other configurations using combinations of axial, radial, and/or mixed flow stages may be used. For example, the first compressor stage and the second turbine stage may be radial and/or the second compressor stage and the first turbine stage may be radial or axial, etc.

The first compressor spool 206 and the second turbine spool 212 are both coupled to a first shaft 214. The second compressor spool 208 and the first turbine spool 210 are coupled to a second shaft 216 different from the first shaft 214. In this example, spools 206 and 212 and shaft 214 are configured to rotate in direction 302, e.g., a counter-clockwise direction, and spool 208 and 210 and shaft 216 are configured to rotate in the same direction 304 as direction 302. In this example, turbocharger 103 may include a plurality of stators or guide vanes 233 and 235 between the two stages of each of the turbine and compressor in order to direct gas flow between the different stages of the turbocharger.

FIG. 3B shows another example multiple spool turbocharger 103 with a two stage compressor 162 and a two stage turbine 164. Like numbers shown in FIG. 3B correspond to like numbered elements shown in FIG. 2 described above. In this example, compressor 162 includes an axial first stage spool 206 and a mixed flow second stage spool 208 and turbine 164 includes a mixed flow first stage spool 210 and an axial second stage spool 212. For example, spool 206 may be a low-pressure axial compressor wheel whereas spool 208 may be a high-pressure radial compressor wheel. Likewise spool 212 may be a low-pressure axial turbine wheel and spool 210 may be a high-pressure radial turbine wheel. Though, FIG. 3B shows an axial first compressor stage, a mixed flow second compressor stage, a mixed flow first turbine stage, and an axial second turbine stage, it should be understood that other configurations using combinations of axial, radial, and/or mixed flow stages may be used. For example, the first compressor stage and the second turbine stage may be radial and/or the second compressor stage and the first turbine stage may be radial or axial, etc.

The first compressor spool 206 and the second turbine spool 212 are both coupled to a first shaft 214. The second compressor spool 208 and the first turbine spool 210 are coupled to a second shaft 216 different from the first shaft 214. In this example, spools 206 and 212 and shaft 214 are configured to rotate in a first direction 302, e.g., a counter-clockwise direction, whereas spool 208 and 210 and shaft 216 are configured to rotate in a second direction 304 opposite the first direction, e.g., clock-wise. Since the two stages in compressor and turbine are configured to counter-rotate, turbocharger 103 may not include any stator or guide vanes between the two stages of each of the turbine and compressor.

Figure 4:
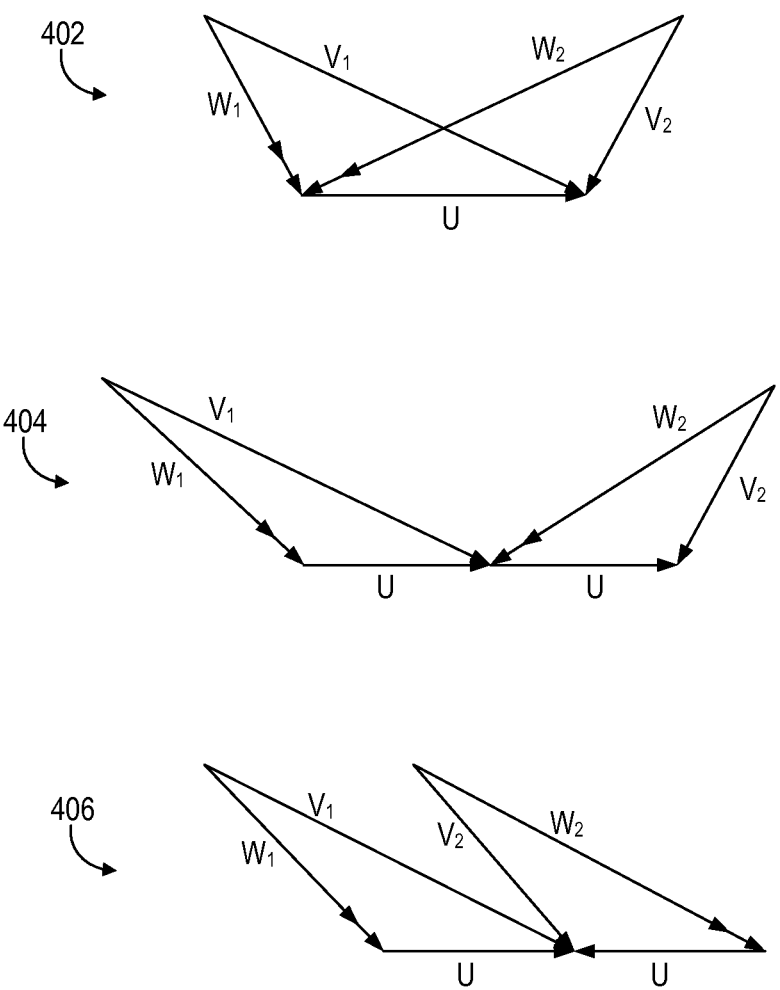
FIG. 4 shows example turbocharger velocity triangle maps.
Figure 5:
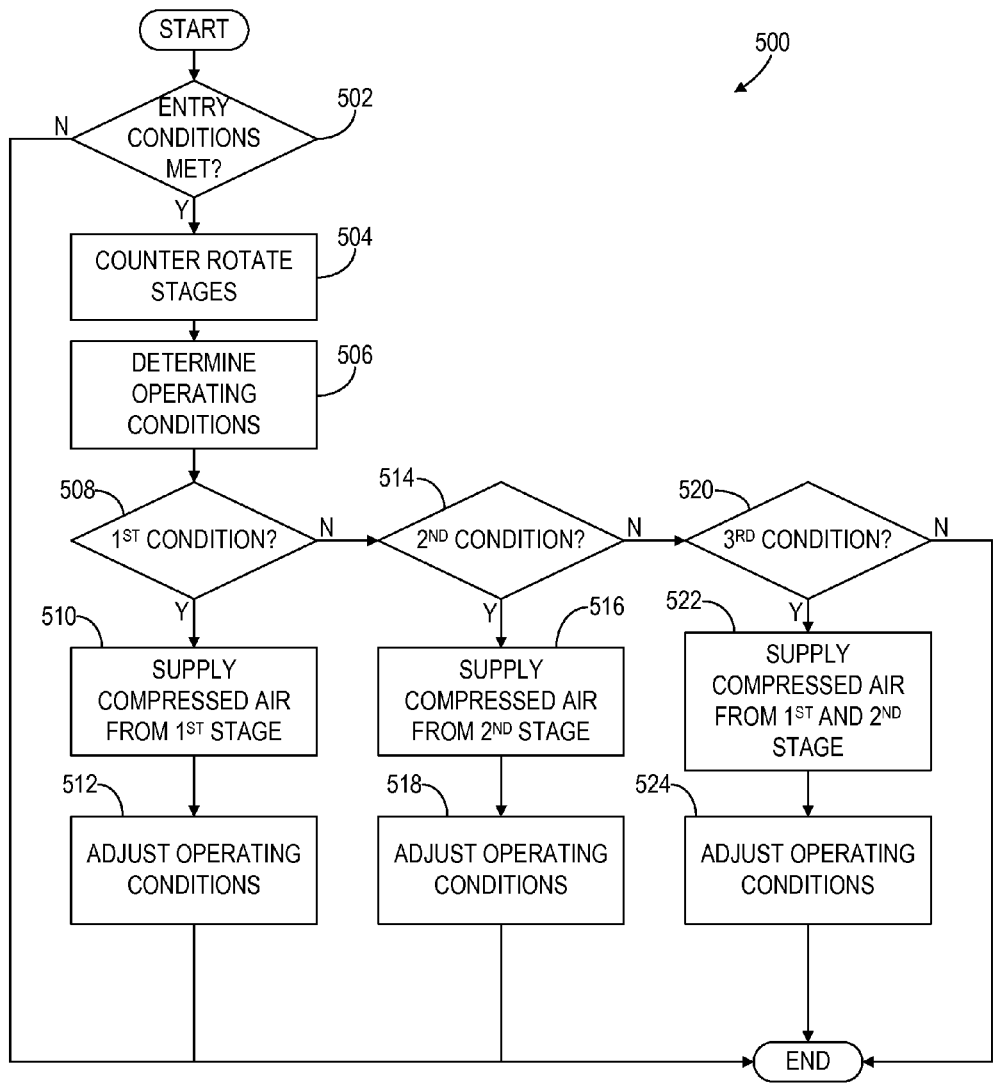
FIG. 5 shows an example method for operating a multiple spool turbocharger.

FIG. 4 shows example representative turbocharger velocity triangle maps for a single stage turbine at 402, a dual stage turbine at 404, and a dual stage counter-rotating turbine at 406. For example, the velocity triangle shown at 406 may be representative of a velocity triangle for the turbine 164 shown in FIG. 3 described above. Here, V represents absolute velocity vectors and W represents relative velocity vectors, U is the rotor speed, location 1 is the inlet to the stage, and location 2 is the outlet.

As shown in FIG. 4, the exit vectors, $V_2$ and $W_2$ change direction drastically on the counter-rotating turbine shown at 406 with respect to the single rotation turbines shown at 402 and 404. By using a two-stage turbine the energy output of the turbine may be increased as compared to a single-stage turbine resulting in higher engine specific output with similar transient performance, or an increase in surge margin and an decrease in time to torque for the engine operation. Further, due to the elimination of the interstage stators and their flow losses in a counter-rotating dual state turbine, such as shown in FIG. 3, the over-all efficiencies may be higher than a conventional turbine where the shafts rotate in a single direction. Additionally, the counter-rotating speed could be kept constant at the single rotation speed, increasing the pressure ratio of the two stage compressor at a similar surge margin, and increasing the boost pressure entering the internal combustions engine, which can increase the specific output. Conversely, the turbine rotor and compressor rotor can be downsized resulting in similar steady state analysis with respect to a single rotating turbine. The lower inertia of the two stage turbine wheels may result in a transient performance benefit such as reduced turbo lag, or reducing time to torque.

FIG. 5 shows an example method 500 for operating a multiple spool turbocharger, such as the turbochargers shown in FIGS. 2 and 3 described above. As remarked above, each spool of a multi-spool turbocharger system can be designed to accomplish different tasks at different operating regimes in the engine system. For example, a two spool can be designed to have each spool operate in a similar regime to balance aerodynamic and mechanical loads in the system. The rotational speed of a spool may be controlled to spooled down or the airflow though a spool can be bypassed in the system to reduce engine pumping work, and increase the low end operating range of the engine further.

At 502, method 500 includes determining if entry conditions are met. Entry conditions may include boosted engine conditions which may be initiated by changes in various engine operating parameters such as a tip-in or tip-out event or a change in engine speed and/or load.

If entry conditions are met at 502, method 500 proceeds to 504. At 504, method 500 includes counter-rotating stages of the turbocharger. As remarked above, different stages of a compressor may be configured to rotate in opposite directions and different stages of a turbine may be configured to rotate in different directions. By counter-rotating subsequent stages in a compressor or turbine, the turbocharger may not include van guides or stators positioned between the subsequent stages. Eliminating these components may result in a reduction in flow losses and an increased output.

At 506, method 500 includes determining operating conditions. For example, engine operating conditions such as engine temperature, exhaust temperature, engine speed, engine load, etc. may be used to adjust operation of the multi-stage turbocharger so that each stage in the turbocharger is selectively employed to operate based on the engine operating conditions. For example, during a low engine speed or load, a low pressure stage in the compressor and/or turbine may be employed to provide compressed air to the engine and/or to drive the turbine, whereas during a high engine speed or load condition, a high pressure stage in the compressor and/or turbine may be employed to provide compressed air the engine and/or to drive the engine. As another example, both spools in both the compressor and turbine may be operated in a similar regime, e.g., during a transient condition, to balance aerodynamic and mechanical loads in the system.

At 508, method 500 includes determining if a first condition is present. For example, the first condition may be a low engine speed or low engine load condition, For example, determining if the first condition is present may include determining if an engine speed or engine load is below a threshold value. If the first condition is present at 508, then method 500 proceeds to 510.

At 510, method 500 includes supplying compressed air from a first stage of the turbocharger. For example, the first stage of the turbocharger may be a low pressure stage, such as the low pressure axial stages 206 and 212 shown in FIG.

2. During low engine speed/load engine operation, this first low pressure stage of the turbocharger may be used to provide compressed air, e.g., via spool 206, to the engine and to drive the turbine, e.g., via spool 212. In some examples, a second stage in the turbocharger may be bypassed during the first condition. For example, bypass 236 may be activated so that spool 208 is not used to supply compressed air to the engine. As another example, bypass 238 may be activated so that turbine spool 210 may not be used to drive the turbocharger during the first condition.

At 512, method 500 includes adjusting engine operating conditions. Examples of engine operating parameters which may be adjusted include the air/fuel ratio, throttle position, valve overlap, ignition timing, etc. For example, valve overlap may be increased and/or ignition delay may be increased, e.g., spark timing may be retarded. For example, the engine may be operated with a first amount of positive valve overlap in at least one cylinder of the engine and/or the engine may be operated with a first amount of spark retard in at least one cylinder of the engine. In some examples, the engine may be operated with a first, increased, amount of fuel.

If at 508, the first condition is not present, then method 500 proceeds to 514 to determine if a second condition is present. For example, the second condition may be a high engine speed or high engine load condition. For example, determining if the second condition is present may include determining if an engine speed or engine load is greater a threshold value. If the second condition is present at 514, then method 500 proceeds to 516.

At 516, method 500 includes supplying compressed air from the second stage of the turbocharger. For example, the second stage of the turbocharger may be a high pressure stage, such as the high pressure radial stages 208 and 210 shown in FIG. 2. During high engine speed/load engine operation, this second high pressure stage of the turbocharger may be used to provide compressed air, e.g., via spool 208, to the engine and to drive the turbine, e.g., via spool 210. In some examples, the first stage in the turbocharger may be bypassed during the second condition. For example, bypass 234 may be activated so that spool 206 is not used to supply compressed air to the engine. As another example, bypass 240 may be activated so that turbine spool 212 may not be used to drive the turbocharger during the second condition. At 518, method 500 includes adjusting operating conditions as described above with regard to step 512.

If at 514 the second condition is not present, then method 500 proceeds to 520 to determine if a third condition is present. For example, the third condition may be a transient condition where the turbocharger is being spooled up or spooled down, e.g., in response to a driver tip-in or tip-out. If the third condition is present at 520, then method 500 proceeds to 522.

At 522, method 500 includes supplying compressed air from the first and second stages of the turbocharger. For example, both the first and second compressor spools 206 and 208 may be used in succession while counter-rotating to compress air for supply to the engine. Further, both first and second counter-rotating turbine spools 210 and 212 may be used to drive the turbocharger. For example, by using both spools in each of the compressor and turbine during the third condition, the transient response may be increased and aerodynamic and mechanical loads in the system may be balanced. At 524, method 500 includes adjusting operating conditions as described above with regard to step 512.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a multiple spool turbocharger in an engine, comprising:
counter-rotating first and second compressor spools and first and second turbine spools of the turbocharger;
during a first condition, wherein the first condition is a low engine load and/or speed operating condition, supplying compressed air from the first compressor spool to the engine and bypassing the second compressor spool;
during a second condition, wherein the second condition is a high engine load and/or speed operating condition, supplying compressed air from the second compressor spool to the engine and bypassing the first compressor spool; and
during a third transient condition, wherein the third transient condition is a tip-in or tip-out, supplying compressed air from both the first and second compressor spools to the engine.

2. The method of claim 1, wherein the first compressor spool is a low pressure spool and the first condition is a low engine speed operating condition.

3. The method of claim 2, wherein the second compressor spool is a high pressure spool and the second condition is a high engine speed operating condition.

4. The method of claim 3, wherein the first compressor spool is coupled to the second turbine spool via a first shaft rotatable in a first direction and the second compressor spool is coupled to the first turbine spool via a second shaft rotatable in a second direction the same or opposite the first direction.

5. The method of claim 3, wherein the first compressor spool is axial, the second compressor spool is radial, the first turbine spool is radial, and the second turbine spool is axial.

6. The method of claim 3, wherein the first compressor spool is radial, the second compressor spool is axial, the first turbine spool is axial, and the second turbine spool is radial.

7. The method of claim 3, wherein at least one of the first compressor spool, the second compressor spool, the first turbine spool, and the second turbine spool is a mixed-flow spool.

8. The method of claim 3, wherein each compressor spool and each turbine spool includes a bypass configured to direct gas flow around the respective spool.

9. The method of claim 3, wherein the turbocharger does not include guide vanes positioned between subsequent compressor spools or subsequent turbine spools.

* * * * *